2,630,473

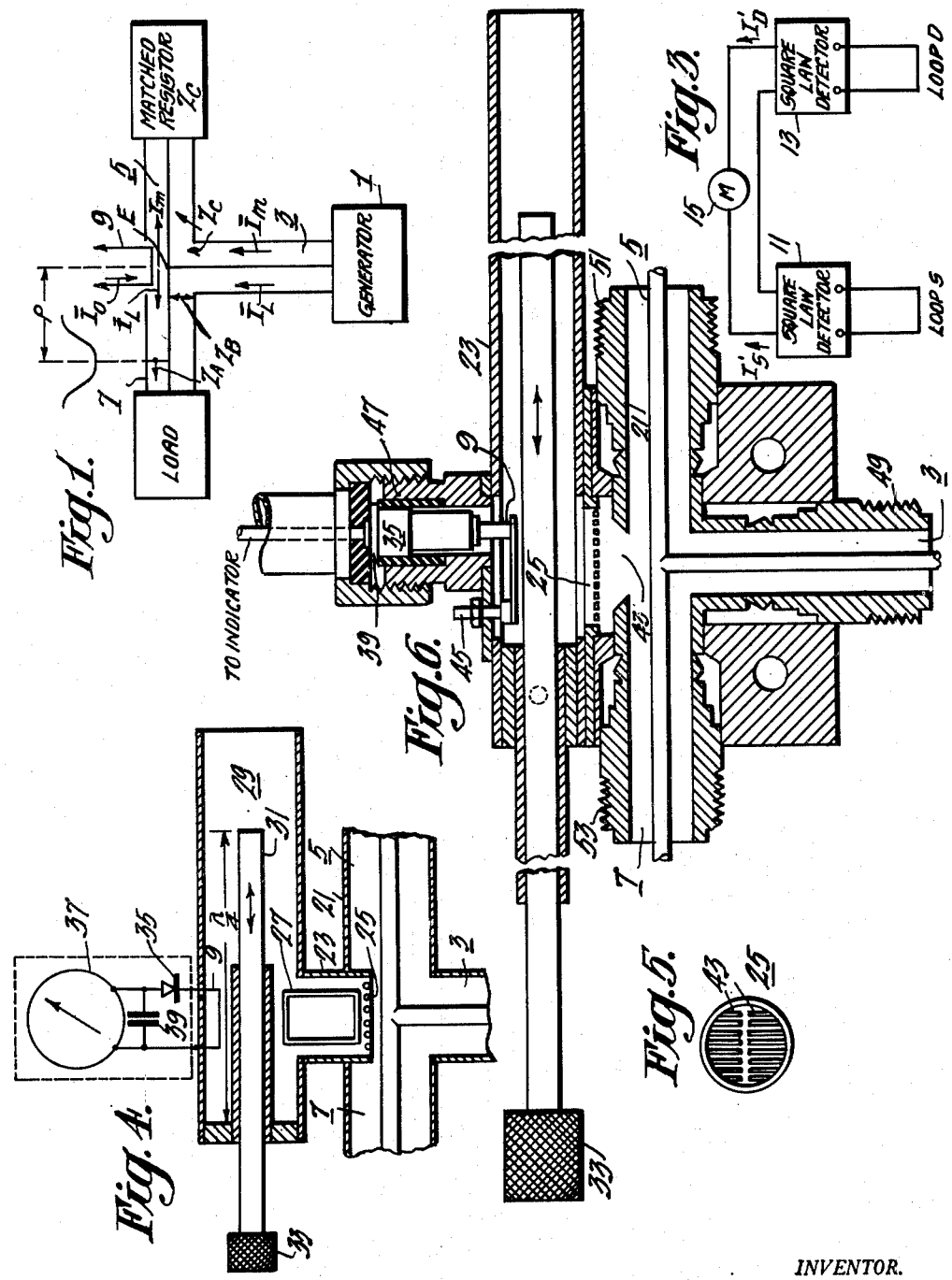

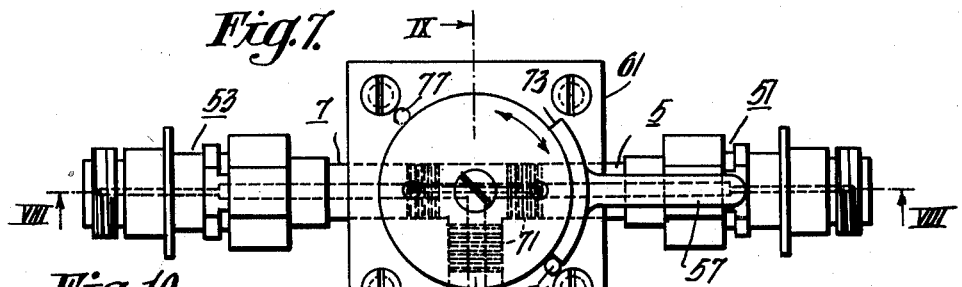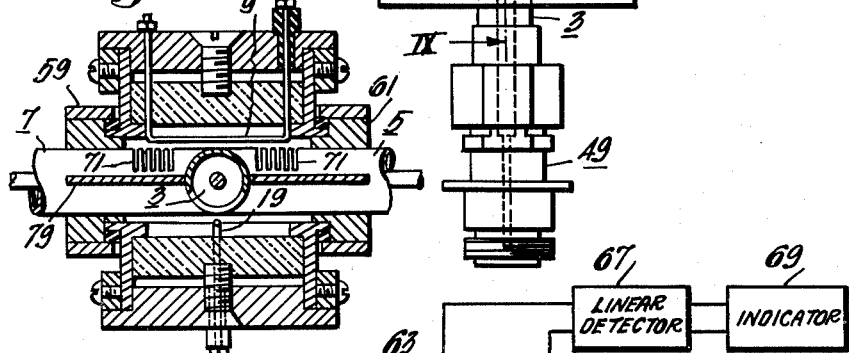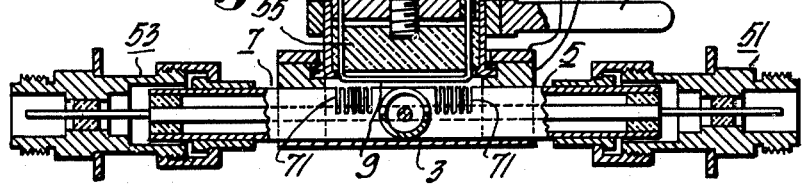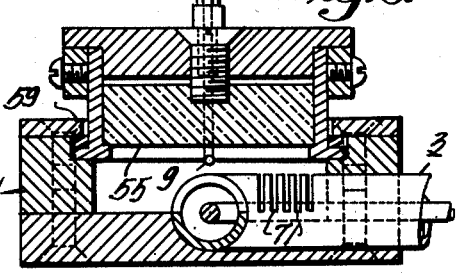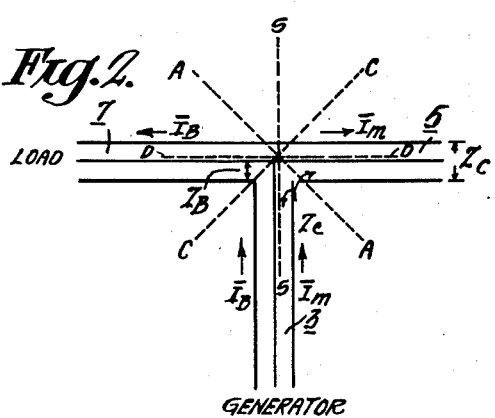
INVENTOR.
Oakley M. Woodward, Jr.
BY
ATTORNEY Patented Mar. 3, 1953

UNITED STATES PATENT OFFICE 2,630,473

TRANSMISSION LINE MEASURING APPARATUS

Oakley M. Woodward, Jr., Princeton, N. J., assignor to Radio Corporation of America, a corporation of Delaware Application April 25, 1945, Serial No. 590,271

5 Claims. (Cl. 175—183)

This invention relates generally to transmission line measuring apparatus and more particularly to improved reflectometers for indicating load matching, load impedance and power delivered to a load through a coaxial or open-wire transmission line.

Customary procedure in matching coaxial transmission lines to a load, in measuring load impedance or in determining the power transmitted to said load has been to employ a slotted section of coaxial line and a sliding-probe indicator. Although this method is quite satisfactory, it is essential that the operator have some knowledge of transmission line theory and practice in order that such measurements may be readily made. In the case of a load having several adjustable elements, the measurement and matching process may be quite complicated. Since the slotted line and movable probe apparatus are primarily laboratory equipment, they are not well suited for field measurements. The instant invention comprises a simple T junction of coaxial line having one or more coupling loops selectively inductively coupled to and capacitively shielded from the conductors of the line T junction.

A first embodiment of the invention permits the measurement of the degree of load impedance mismatch to the transmission line. A second embodiment of the invention permits measurements of load matching, load impedance, load current, reflection coefficient and standing wave ratio characteristics of the system. A third embodiment of the invention permits additional measurements of load power.

Fundamentally, the several embodiments of the instant invention comprise current comparison systems in which the current in the load line and matched line is compared to the current in the generator line which is connected through the T junction to both the load line and the matched line. One or more current pickup loops are symmetrically placed with respect to the T junction to couple selectively magnetically to three coaxial lines which are connected respectively to the generator, the matched line, and the load line. The matched line is matched with a known resistor having a value equivalent to the line surge impedance. The coupling loop or loops may be fixed or rotatable and are coupled to the T junction in different manners depending upon the type of measurement to be made, as will be described in greater detail hereinafter. The structure may be readily modified for measurements on an open-wire line.

Among the objects of the invention are to provide an improved method of and means for measuring the transmission of energy through a transmission line connecting a generator to a load. Another object of the invention is to provide an improved reflectometer for measuring the degree of mismatch of a load connected to a coaxial transmission line. An additional object of the invention is to provide an improved reflectometer for measuring the impedance of a load connected to a coaxial transmission line. A further object of the invention is to provide an improved reflectometer for measuring the current transmitted to a load through a coaxial transmission circuit. A still further object of the invention is to provide an improved device for measuring the reflection coefficient or the standing wave ratio in a coaxial transmission line connecting a high frequency generator to a load. Another object is to provide an improved device for measuring the power transmitted through a coaxial transmission line connecting a generator to a load. An additional object is to provide an improved reflectometer comprising a T junction of three coaxial transmission lines, and at least one coupling loop inductively coupled to said T junction for measuring the energy characteristics in a transmission line connecting a generator to an unknown load and to a matched load.

The invention will be described in greater detail by reference to the accompanying drawings of which Figure 1 is a schematic circuit diagram of a first embodiment of the invention, Figure 2 is a schematic diagram explanatory of second and third embodiments of the invention, Figure 3 is a schematic circuit diagram of the detector and the indicator portions of the embodiment of the invention adapted to provide power measurements, Figure 4 is a fragmentary cross-sectional view of a first embodiment of the invention for measuring the degree of load matching, Figure 5 is a plan view of the electrostatic shield comprising an element of the device shown in Figure 4, Figure 6 is a cross-sectional view of a modification of said first embodiment of the invention, Figure 7 is a plan view of a second embodiment of the invention, Figure 8 is a cross-sectional, elevational view taken along the section line VIII—VIII of said second embodiment of the invention, Figure 9 is an enlarged, fragmentary, cross-sectional view taken along the section line IX—IX of said second embodiment of the invention, and Figure 10 is a cross-sectional view of a third embodiment of the invention. Similar reference characters are applied to similar elements throughout the drawings.

Referring to Figure 1, a high frequency generator 1 is connected through a generator coaxial line 3 to a T junction with two other coaxial lines 5, 7, which are connected, respectively, to a matched resistor $Z_c$ and to a load. A coupling loop 9 comprising a single turn is symmetrically coupled to the branch coaxial lines 5 and 7 at the T junction of the three lines 3, 5 and 7. The coupling loop and the centers of the conductors forming the T junction are in a common plane. Zero current will flow in the pickup loop 9 when the load current $I_L$ and the matched line current $I_m$ are equal and in phase. This condition obtains only when the load impedance equals the matched line impedance $Z_c$ since the two branch lines 5 and 7 are fed by a common voltage E at the T junction. The matching resistor $Z_c$ is assumed to match exactly the surge impedance of the coaxial line 5. For any other load impedance, a resultant current will be induced in the pickup loop 9. This current may be rectified and indicated by means of a detector and a D.-C. meter, not shown, to indicate the degree of mismatch of the load impedance to the surge impedance of the load transmission line 7.

Assuming a mismatched load, a standing wave will be produced as shown in Figure 1.

The impedance of the load line at the junction is $$\bar{Z}_B = \frac{\bar{E}}{\bar{I}_L} \quad (1)$$

and the impedance of the matched line is $$\bar{Z}_c = \frac{\bar{E}}{\bar{I}_m} \quad (2)$$

Hence $$\bar{I}_L = \bar{I}_m \times \frac{\bar{Z}_c}{\bar{Z}_B} \quad (3)$$

Obtaining the impedance of $Z_B$ in terms of $Z_A$ and $\rho$, where $\rho$ is the length in electrical degrees from a voltage minimum of the load line 7 to the T junction; and $Z_A$ is the voltage minimum occurs:

$$\bar{Z}_B = \frac{\bar{Z}_A + j Z_c \tan \rho}{Z_c + j \bar{Z}_A \tan \rho} \times Z_c$$

or $$\frac{\bar{Z}_B}{Z_c} = \frac{\left(\frac{\bar{Z}_A}{Z_c}\right) + j \tan \rho}{1 + j\left(\frac{\bar{Z}_A}{Z_c}\right)\tan \rho} \quad (4)$$

But $$Z_A = Z_c \times \mathcal{R} \quad (5)$$

where $R$ is the standing wave ratio on the load line. Therefore $$\frac{\bar{Z}_B}{Z_c} = \frac{\mathcal{R} + j \tan \rho}{1 + j\mathcal{R} \tan \rho} \quad (6)$$

Substituting in Equation 3:

$$\bar{I}_L = \bar{I}_m \frac{(1 + j\mathcal{R} \tan \rho)}{(\mathcal{R} + j \tan \rho)} \quad (7)$$

The current ($I_0$) induced in the pickup loop is proportional to the difference of the two currents $I_L$ and $I_m$.

$$\bar{I}_0 = K(\bar{I}_L - \bar{I}_m) = K\bar{I}_m \left[\frac{(1 + j\mathcal{R} \tan \rho)}{(\mathcal{R} + j \tan \rho)} - 1\right] \quad (8)$$

where K is a proportionality constant depending upon the loop area, spacing, frequency, etc.

$$I_0 = (KI_m)\frac{(1 + j\mathcal{R} \tan \rho - \mathcal{R} - j \tan \rho)}{(\mathcal{R} + j \tan \rho)} =$$
$$\left(\frac{KE}{Z_c}\right)\frac{(1 - \mathcal{R})(1 - j \tan \rho)}{(\mathcal{R} + j \tan \rho)}$$

(9)

The absolute value of the pickup loop current is $$|I_0| = \left(\frac{KE}{Z_c}\right)(1 - \mathcal{R})\sqrt{\frac{(1 + \tan^2 \rho)}{(\mathcal{R}^2 + \tan^2 \rho)}} \quad (10)$$

Assuming a constant standing wave ratio, the pickup loop current will vary as a function of the relative position of the standing wave with respect to the T junction. For this condition the current $I_0$ will vary from a maximum of $$\frac{(1 - \mathcal{R})}{\mathcal{R}}$$

for $\rho = 0°$ to a minimum of $(1 - R)$ for $\rho = 90°$ $$\frac{I_{\min}}{I_{\max}} = \frac{(1 - \mathcal{R})}{\frac{1 - \mathcal{R}}{\mathcal{R}}} = \mathcal{R} \quad (11)$$

Hence the ratio of the minimum current to the maximum current for a constant standing wave ratio and a variable standing wave shift is seen to be equal to the standing-wave-ratio.

For simplicity, a fixed crystal detector, not shown, may be employed as the rectifier in the pickup loop circuit. Therefore, the meter deflection will be proportional to the square of the pickup current. Since a constant input voltage E may be assumed, it is seen that, as the load impedance approaches a match with the surge impedance of the transmission line, the rate of change of the indicating meter deflection rapidly diminishes. In actual practice, the load line 7 may be matched with adjustable elements such as inductive stubs, each stub being adjusted in turn for minimum meter deflection until the meter provides null or substantially zero indication. Although the exact standing wave ratio of a mismatched load cannot be obtained directly with this embodiment of the invention, an experienced operator may estimate quite accurately standing wave ratios in the higher range for fixed generator power output.

A second embodiment of the invention is illustrated schematically in Figure 2, wherein the T junction formed by the three coaxial lines 3, 5 and 7 is coupled to a rotatable coupling loop disposed in a plane S—S normal to the common plane through the three coaxial lines forming the T junction. The plane of the coupling loop may be rotated through an angle of 90° to the position D—D. If desired, as explained in greater detail hereinafter, two separate coupling loops may be employed, one being disposed in the plane S—S and the other being disposed in the plane D—D. The two coupling loops would be both magnetically and electrostatically shielded from each other. Lines through the centers of the coupling loops would coincide with the center of the T junction.

Considering first the embodiment of the invention employing a single rotatable coupling loop, in the position S—S the loop is coupled substantially only inductively to the generator coaxial line 3. The coupling is substantially purely inductive since the loop is electrostatically shielded from the coaxial line by slots in the outer conductor of the lines, which will be described in greater detail by reference to the structure of Figures 7, 8 and 9. When the loop is in the plane D—D, it is inductively coupled substantially only to the matched line 5 and the load line 7. When the coupling loop is in the plane D—D, a current $I_D$ is induced in the loop which is proportional to the vector difference of the load current $I_B$ and the matched line current $I_m$. When the loop is in the plane S—S, a current $I_S$ is induced in the loop which is proportional to the vector sum of the load current $I_B$ and the matched line current $I_m$.

$$\bar{I}_m = \frac{\bar{E}}{Z_c} \qquad (12)$$

$$\bar{I}_B = \frac{\bar{E}}{Z_B} = \frac{\bar{E}}{R_B + jX_B} \qquad (13)$$

where $R_B$ and $X_B$ are the resistive and reactive components of the load impedance $Z_B$.

$$\bar{I}_m + \bar{I}_B = \frac{\bar{E}}{Z_c} + \frac{\bar{E}}{R_B + jX_B} = \bar{E}\left(\frac{Z_c + R_B + jX_B}{Z_c(R_B + jX_B)}\right) = \left(\frac{\bar{E}}{R_B + jX_B}\right)\left(1 + \frac{R_B + jX_B}{Z_c}\right) \qquad (14)$$

$$\bar{I}_m - \bar{I}_B = \frac{\bar{E}}{Z_c} - \frac{\bar{E}}{R_B + jX_B} = \bar{E}\left(\frac{R_B + jX_B - Z_c}{Z_c(R_B + jX_B)}\right) = \left(-\frac{\bar{E}}{R_B + jX_B}\right)\left(1 - \frac{R_B + jX_B}{Z_c}\right) \qquad (15)$$

The ratio of the absolute magnitudes of the loop currents in the planes D—D and S—S is $$\frac{\bar{I}_D}{\bar{I}_S} = \frac{1 - \frac{R_B + jX_B}{Z_c}}{1 + \frac{R_B + jX_B}{Z_c}} \qquad (16)$$

The general transmission line equation is $$i = \frac{\bar{I}_0}{2}\left(1 - \frac{Z_B}{Z_c}\right)\epsilon^{(\alpha + j\beta)x} + \frac{\bar{I}_0}{2}\left(1 + \frac{Z_B}{Z_c}\right)\epsilon^{-(\alpha + j\beta)x} \qquad (17)$$

wherein the first term is representative of the reflected wave, and the second term is representative of the incident wave in the load line 7.

Therefore, it is seen that the ratio of the absolute magnitudes of the currents in the loop when it is oriented in the planes D—D and S—S, provides the ratio of the magnitudes of the reflected wave and of the incident wave, which by definition is the reflection coefficient K. Hence, in operation of the device, if the coupling loop 9 is connected to a linear detector, and the linear detector is connected to a suitable D.-C. indicator, the ratio of the rectified loop currents provides the reflection coefficient K. The indicating meter may be calibrated in terms of the standing wave ratio ℜ on the load line 7, since ℜ equals $$\frac{(1-K)}{(1+K)}$$

The gain of the detector or the power output of the generator may be adjusted to provide full scale reflection of the indicator when the loop is in the plane S—S. Then by rotating the loop to the plane D—D, the standing wave ratio ℜ may be read directly on the meter scale.

The alternative arrangement wherein two loops are employed, one in the plane S—S and the other in the plane D—D, may utilize a single detector and indicator which may be switched to either loop, or separate detectors and indicators may be used. Since the two loops must be magnetically and electrostatically shielded from each other, the most convenient arrangement is to locate them on opposite sides of the T junction and to shield them by means of a magnetic shield disposed in the plane of the T junction, as is shown in Figure 10.

Although the reflectometer is substantially independent of frequency (assuming that the matched resistor is matched at all operating frequencies), the physical size of the coupling loop or loops must be taken into consideration. If the loop is wide enough or the frequency sufficiently high, the loop current will be an integration of the varying line currents produced by mismatch of the load, and will not indicate the load currents flowing only at the T junction.

It is noted that when the loop is in the plane D—D, the device operates in essentially the same manner as that described heretofore with respect to the arrangement of Figure 1. However, by providing the rotatable coupling loop, or by utilizing two coupling loops disposed at right angles, the device provides the additional indications of load power, load matching, reflection coefficient, and standing-wave-ratio.

For measurement of load power (see Fig. 3) the loop in the plane S—S is connected to a first square-law detector 11, and the loop in the plane D—D is connected to a second square-law detector 13. The rectified output currents $I'_S$ and $I'_D$ from the two square-law detectors are connected in series opposition to a common D.-C. current indicator 15 whereby $$I'_S = [N(\bar{I}_B + \bar{I}_m)]^2 = N^2 I_B^2\left(\frac{1}{Z_c} + \frac{2R_B}{Z_c} + \frac{R_B^2}{Z_c^2} + \frac{X_B^2}{Z_c^2}\right) \qquad (18)$$

$$I'_D = [N(\bar{I}_B - \bar{I}_m)]^2 = N^2 I_B^2\left(\frac{1}{Z_c} - \frac{2R_B}{Z_c} + \frac{R_B^2}{Z_c^2} + \frac{X_B^2}{Z_c^2}\right) \qquad (19)$$

$$I'_S - I'_D = \left(\frac{4R_B}{Z_c}\right)(N^2 I_B^2) \qquad (20)$$

$$P_B = I_B^2 R_B \qquad (21)$$

$$\therefore I'_S - I'_D = \frac{4N^2}{Z_c} P_B \qquad (22)$$

wherein N is a proportionality constant.

The power indicating meter 15 may be calibrated by applying known values of power to the load.

Again referring to Figure 2, the absolute magnitude and the phase angle of the load impedance may be determined by deriving the loop currents in two additional planes A—A and C—C which are disposed at 45° angles with respect to the conductors forming the T junction. The current $I_C$ in the coupling loop when it is disposed in the plane C—C is $$\bar{I}_C = \frac{\bar{I}_m}{\sqrt{2}} + \frac{\bar{I}_m}{\sqrt{2}} = \sqrt{2}\bar{I}_m \qquad (23)$$

since components of the load current $I_B$ flow in opposite directions when the loop is in the plane C—C.

$$\bar{I}_A = \frac{\bar{I}_B}{\sqrt{2}} + \frac{\bar{I}_B}{\sqrt{2}} = \sqrt{2}\bar{I}_B \qquad (24)$$

since components of the matched line current $I_m$ flow in opposite directions when the coupling loop is in the plane A—A $$\bar{I}_m = \frac{\bar{E}}{Z_c} \qquad (25)$$

$$\bar{I}_B = \frac{\bar{E}}{Z_B} \qquad (26)$$

$$\frac{\bar{I}_m}{\bar{I}_B} = \frac{Z_B}{Z_c} = \frac{\bar{I}_C}{\bar{I}_A} \qquad (27)$$

Hence the ratio of the loop currents in the two planes C—C and A—A provides the absolute magnitude of the load impedance in terms of the line characteristic impedance. Since $$I_S = [I_m + I_B \cos\phi + jI_B \sin\phi] \quad (28)$$

$$I_D = [I_m - I_B \cos\phi - jI_B \sin\phi] \quad (29)$$

where $\phi$ is the phase angle of the load impedance $$I_S^2 = I_m^2 + 2I_mI_B \cos\phi + I_B^2 \quad (30)$$

$$I_D^2 = I_m^2 - 2I_mI_B \cos\phi + I_B^2 \quad (31)$$

$$I_S^2 - I_D^2 = 4I_mI_B \cos\phi \quad (32)$$

$$I_mI_B = \frac{I_AI_C}{2} \quad (33)$$

$$\therefore \cos\phi = \frac{I_S^2 - I_D^2}{2I_AI_C} \quad (34)$$

$$\phi = \cos^{-1}\frac{I_S^2 - I_D^2}{2I_AI_C} \quad (35)$$

It should be noted that the sign of the phase angle is not obtained by these measurements.

Figure 4 shows one embodiment of the invention which provides means for indicating the degree of mismatch of the load impedance. The coaxial lines 3, 5 and 7 are provided with conventional connectors, not shown, for connection to the generator line, the matching resistor and the load, respectively. An aperture is provided in the outer conductor 21 of the lines 5 and 7 adjacent to the T connection with the generator line 3. A short conductive tube 23, set into the T junction at said aperture, includes a screen 25 for providing electrostatic shielding for, but inductive coupling to, the inner conductors of the transmission lines at the T junction. A small closed coupling loop 27, enclosed within the tubular member 23, provides inductive coupling from the load and matched lines, symmetrically with respect to the T junction, to a quarter-wave resonant line 29 which is tunable by means of a telescopic inner conductor 31, the longitudinal penetration of which is controlled by means of a control knob 33.

The quarter-wave resonant line 29 is coupled to the coupling loop 27 adjacent the short-circuited end of said line, thus providing high sensitivity and selectivity. The pickup loop 9 is coupled into the resonant line 29 at another point near the shorted end of the line. A crystal detector, or other high frequency detecting device, 35, is connected in series with the pickup loop 9 and a D.-C. indicating device 37. A bypass capacitor 39, connected across the indicator circuit adjacent the detector 35, bypasses the alternating components derived from the detector. If desired, amplification may be provided in the line connecting the detector and bypass capacitor to the indicator 37.

In operation, the cavity resonator 29 is adjusted until maximum sensitivity is provided at the operating frequency. The matching resistor connected to the matched line 5 may comprise a non-inductive resistor equal to the surge impedance of the generator line, and mounted within a conventional connector plug inserted into the matched line connector. In operation the adjusting elements of the load and the load line are adjusted separately to provide minimum indications on the indicator 37. When all load and load line tuning elements are properly adjusted, a null reading should be provided on the indicator.

Figure 5 illustrates the construction of the electrostatic shield 25 which is interposed between the coupling loop 27 and the T junction. The shield may comprise a circular bezel 41 supporting only one end of the group of parallel disposed wires 43 which extend to within a short distance of each other at a line through the center of the bezel.

The structure of Figure 6 is similar to that of Figure 4 with the exception that the coupling loop 27, and the tubular member 23 surrounding it, have been omitted. The bezel 25 is inserted directly adjacent the aperture 43 in the outer conductor wall 21 adjacent the T junction. The pickup loop 9 comprises a short, flat metallic strip supported by a grounded terminal 45 and contacting the end terminal of the tubular crystal detector 35. The crystal detector 35 is enclosed within a connector plug element 47 which includes structure forming the bypass capacitor 39. The connector 47 provides means for connecting the detector through a coaxial line to the indicator at a remote point. Conventional connectors 49, 51 and 53 are provided in the three coaxial lines 3, 5 and 7, respectively, at short distances from the T junction for connections to the generator, matched resistor and load, respectively.

Figures 7, 8 and 9 show the construction of the second embodiment of the invention wherein the coupling loop is rotatable in a plane normal to the plane of the coaxial lines 3, 5, 7, forming the T junction. The coupling loop 9 comprises a single loop of wire supported in an insulating block 55 which is rotatable by means of a control shaft 57 within a bearing formed by means of a shoulder 59 supported by the frame 61 which is clamped to the coaxial lines at the T junction. The coupling loop 9 is brought out to a grounded terminal 63 and an ungrounded terminal 65 which may be connected in any desired manner to a linear detector 67 which is connected to a D.-C. indicator 69. Inductive coupling, but substantially perfect electrostatic shielding, between the inner conductors of the coaxial lines and the coupling loop, is provided by means of slots 71 cut in the sides of the outer conductors of the coaxial lines 3, 5, 7, immediately adjacent the T junction.

The control shaft 57 may include a stop element 73 which cooperates with two fixed stops 75 and 77 to permit rotation of the coupling loop only within an angle of 90° to provide for alternate coupling to either the generator line or to the load and matched lines, for providing indications of load matching, load current, reflection coefficient or standing-wave-ratio, as described heretofore.

If the system is to be employed for measurement of absolute load impedance or load phase angle, the stops should be located to permit the coupling loop also to be oriented in the planes A—A and C—C, as described with reference to Figure 2.

The structure of Figure 10 shows a third embodiment of the invention which is a modification of the structures of Figures 7, 8 and 9, wherein a second coupling loop 19 is disposed on the opposite side of the T junction from the first coupling loop 9. The coupling loops may be connected to the same detector and indicator by simple switching means, not shown, or they may be connected to separate detectors and indicators as explained heretofore.

In order to provide magnetic shielding between the coupling loops 9 and 19, a flat shielding member 79 is interposed between the outer conductors of the three coaxial lines 3, 5 and 7 in the space adjacent the T junction enclosed within the frame 61. The load and matched line outer conductors are slotted adjacent the T junction on the side of the shielding member 79 adjacent to the first coupling loop 9. The generator line outer conductor is slotted on the opposite or underside of the shielding plate 79 adjacent the T junction. Thus, the first coupling loop 9 is inductively coupled to and capacitively shielded from the load and matched lines 5 and 7, and the second coupling loop 19 is inductively coupled to and capacitively shielded from the generator line 3. However, the coupling loops 9 and 19 are both electrostatically and magnetically shielded from each other. Thus, two fixed coupling loops are disposed at right angles for obtaining the load power measurements described heretofore.

Thus, the invention described comprises several embodiments and modifications of an improved reflectometer for indicating load matching, absolute load impedance, load phase angle, load power, reflection coefficient and standing-wave-ratio in a line connecting a generator to an unknown load.

I claim as my invention:

1. An energy detecting device for a transmission line including a plurality of sections of line having a common junction, means for connecting said transmission line to one of said line sections, means for connecting a load to another one of said line sections, means for connecting an impedance element substantially matched to the surge impedance of said transmission line to the remaining one of said line sections, a coupling loop coupled in predetermined angular relation to said line sections at said junction and coupled by means including a shield placed symmetrically with respect to the junction plane and between said junction and said loop and having a plurality of parallel slots, to said load and impedance element line sections, and energy detecting means responsive to currents induced in said coupling loop.

2. An energy detecting device for a coaxial transmission line including a plurality of sections of coaxial line having a common junction, means for connecting said transmission line to one of said line sections, means for connecting a load to another one of said line sections, means for connecting an impedance element substantially matched to the surge impedance of said transmission line to the remaining one of said line sections, a coupling loop inductively coupled in predetermined angular relation to said line sections at said junction and capacitively shielded from said junction by means including a shield member having a plurality of parallel slots, said loop being coupled to said load and impedance element line sections by means including said slots, said shield lying between said loop and said junction in a fashion symmetrical with respect to the junction plane, and energy detecting means responsive to currents induced in said coupling loop.

3. An energy measuring device for a coaxial transmission line including a plurality of sections of coaxial line having a common junction, means for connecting said transmission line to one of said line sections, means for connecting a load to another one of said line sections, means for connecting an impedance element substantially matched to the surge impedance of said transmission line to the remaining one of said line sections, a coupling loop inductively coupled in predetermined angular relation to said line sections at said junction and capacitively shielded from said load line and said impedance line sections with respect to said junction by a metallic shield having a plurality of parallel slots and coupled to said load and impedance element line sections by means including said slots, said shield being interposed between said junction and said loop and symmetrically positioned with respect to a plane of symmetry between said impedance element and load line sections, and means for connecting energy detecting and measuring means responsive to currents induced in said coupling loop for indicating the matching of said load impedance to said transmission line surge impedance.

4. Apparatus as claimed in claim 3 including adjustable resonant means asymmetrically positioned with respect to said load line and impedance line sections and interposed between said coupling loop and said load line and impedance line sections for increasing the sensitivity and selectivity of said detecting means.

5. Apparatus as claimed in claim 3 including a second coupling loop connected to said energy detecting means, and adjustable resonant means asymmetrically positioned with respect to said load line and impedance line sections and interposed between said coupling loops for increasing the sensitivity and selectivity of said detecting means.

OAKLEY M. WOODWARD, JR.

REFERENCES CITED

The following references are of record in the file of this patent:

UNITED STATES PATENTS

| Number | Name | Date |
|---|---|---|
| 2,288,030 | Salinger | June 30, 1942 |
| 2,307,447 | Braaten | Jan. 5, 1943 |
| 2,314,764 | Brown | Mar. 23, 1943 |
| 2,323,076 | Paul | June 29, 1943 |
| 2,410,838 | Ring | Nov. 12, 1946 |
| 2,416,790 | Barrow | Mar. 4, 1947 |
| 2,422,601 | Tashjian | June 17, 1947 |
| 2,425,084 | Cork et al. | Aug. 5, 1947 |
| 2,445,895 | Tyrrell | July 27, 1948 |
| 2,503,256 | Ginzton et al. | Apr. 11, 1950 |